United States Patent [19]
Heck

[11] Patent Number: 5,202,781
[45] Date of Patent: Apr. 13, 1993

[54] ARRANGEMENT FOR THE WAVEGUIDE-FREE BIDIRECTIONAL LIGHT OR INFRARED TRANSMISSION OF ELECTRICAL SIGNALS

[75] Inventor: Marco Heck, Neuss, Fed. Rep. of Germany

[73] Assignee: SenSys AG, Kaiserstuhl, Switzerland

[21] Appl. No.: 650,909

[22] Filed: Feb. 5, 1991

[30] Foreign Application Priority Data

Feb. 22, 1990 [DE] Fed. Rep. of Germany ....... 4005517

[51] Int. Cl.$^5$ ............................................. H04B 10/00
[52] U.S. Cl. ...................................... 359/152; 359/113
[58] Field of Search ................ 359/143, 146, 152, 113, 359/162, 172, 174; 455/76

[56] References Cited

U.S. PATENT DOCUMENTS

| | | | |
|---|---|---|---|
| 3,875,399 | 4/1975 | Teich | 359/162 |
| 4,677,982 | 7/1987 | LLinas et al. | 359/143 |
| 4,764,981 | 8/1988 | Miyahara et al. | 359/143 |
| 4,792,995 | 12/1988 | Harding | 359/143 |
| 5,121,241 | 6/1992 | Veith | 359/113 |

FOREIGN PATENT DOCUMENTS 2165036  8/1972  Fed. Rep. of Germany .
2621540 11/1976  Fed. Rep. of Germany .
2534658  2/1977  Fed. Rep. of Germany .
3709000 10/1987  Fed. Rep. of Germany .

OTHER PUBLICATIONS

W. Hirschmann, "Lichttelefon", Elektor, May 1983, p. 5–53 to 5–52.
J. Stekelenburg, "Weitbereichs-IR Sender/Empfanger," Elektor Nov. 1987, pp. 52–57.
M. Skolnik "Radar Handbook", pp. 17–4 to 17–5; 19–6 to 19–7 (1970).
H. G. Unger, "Optische Nachrichtentechnik" Ch. 7 (1976).
W. Hoffmann, "Unterrichtsblatter" vol. 27, Jun. 1974 pp. 135–142.
H. Pooch, "Richtfunktechnik", pp. 13–16; 166–172 (1974).

Primary Examiner—Edward L. Coles, Sr.
Assistant Examiner—Kinfe-Michael Negash
Attorney, Agent, or Firm—Marmorek, Guttman & Rubenstein

[57] ABSTRACT

A waveguide-free, simultaneous, bidirectional optical transmission system is disclosed. Each device includes one oscillator for generating a frequency modulated signal. This frequency modulated signal is used for both transmitting a local information signal and for mixing a received modulated signal to produce an intermediate frequency signal of a fixed constant sum frequency. Each device has an FM discriminator for demodulating the intermediate frequency signal to produce a base band signal. Finally, a subtractor is supplied to each device for subtracting the local information signal from the base band signal to recover the received information signal.

12 Claims, 3 Drawing Sheets

ARRANGEMENT FOR THE WAVEGUIDE-FREE BIDIRECTIONAL LIGHT OR INFRARED TRANSMISSION OF ELECTRICAL SIGNALS

FIELD OF THE INVENTION

The present invention is directed to a waveguide-free bidirectional light or infrared transmitter-receiver system.

BACKGROUND OF THE INVENTION

It is known to transmit signals as optical radiation. The following prior art methods can be distinguished.

(a) remote operative systems

The transmission of information is typically accomplished by directly varying the optical output of a radiation source with a digital information signal. For example, a remote control transmitter used for entertainment electronics operates in this manner. This system has the disadvantage that only one information signal can be transmitted at a time in a single direction.

(b) sound transmission systems

The infrared transmission of an audio signal, e.g., the transmission for the television accompanying sound to a battery-operated head receiver, is known. Such systems modulate the frequency of a subcarrier signal with an information base band signal. The modulated signal varies the output of an infrared radiation source with the momentary frequency of the modulated subcarrier. The system is disadvantageous because a direct visual contact between the optical emitter and the optical receiver is necessary. Further, information is only transmitted in one direction.

(c) bidirectional sound transmission system

An infrared sound transmission according to the above example (b) is known which supports bidirectional transmission. In establishing a bidirectional connection in such systems, each transceiver station must be designed such that the modulated radiation emitted by the optical emitter of each station impinges only on the receiver of the other station, i.e., an emitted signal from one station should not impinge on the detector of the same station. See W. Hirschmann, "Lichttelefon," *Elektor*, May, 1983, p. 5-53 to 5-52;; J. Stekelenburg, "Weitbereichs-IR-Sender/Empfänger," *Elektor*, November, 1987, p. 52-57. This system has the disadvantage that the stations communicating with one another have to be exactly aligned with respect to one another.

Furthermore, it is possible to transmit electrical signals as frequency modulated optical signals between two devices by providing each device with a transmitter and a receiver, wherein each transmitter and receiver includes a frequency oscillator for frequency modulation or frequency demodulation. Accordingly, a total of four oscillators and four different frequencies are required. Such systems, therefore, have a high cost.

German disclosure document 38 32 48b discloses a data processing system including a central processor and a plurality of data processing terminals located at least several meters from the central processor. The processor and each of the data processing terminals are provided with emitters and receivers for transmitting and receiving infrared signals. The transmission of data is realized by means of infrared radiation wherein the processor communicates with each data processing terminal successively. Accordingly, such an arrangement allows the bidirectional exchange of information between the central unit and periphery. However, this system does not support simultaneous bidirectional exchange of information.

SUMMARY OF THE INVENTION

The present invention provides a system which supports the simultaneous, substantially trouble-free, bidirectional transmission of signals between two devices with an especially low structural expense. According to the invention, two devices are provided which each have an optical detector for receiving a frequency modulated signal from the other device. Each device also has a frequency oscillator for producing a local frequency modulated signal by modulating a local information signal onto a sub-carrier signal. Additionally, a mixer is provided to each device which mixes the local and received modulated signals to produce a sum signal. Each device is provided with a demodulator which demodulates a remotely generated signal from the sum signal. It is possible to recover the remote information signal since the local information signal is known.

The frequency oscillators of both devices have different mean frequencies. One frequency oscillator per device is used for generating both the modulated signal which drives the optical emitter as well as the mixing signal which is mixed with the received modulated signal to produce an intermediate frequency signal (sum signal) having a particular, well-defined and fixed intermediate frequency (sum frequency). The radiation directly transmitted from the optical emitter to the optical receiver of the same device does not result in any degradation in communication ability. This is because the (weak) received modulated signal of the opposite station is mixed with a mixing signal which is identical to the locally transmitted signal, to produce the sum signal. This sum signal is then subjected to a frequency demodulation to produce a signal which is the linear superposition of the remote information signal to be received and the local information signal to be emitted. Such a signal is produced because the local frequency-modulated signal is used for the formation of the sum signal.

According to a preferred embodiment of the invention, the mean frequencies of the frequency oscillators of both devices are illustratively variable, and certain well-defined frequencies (channels) are selectable. Accordingly, the frequency oscillators of both devices illustratively have a plurality of mean frequency pairs for use in bidirectional communication. Illustratively, the sum of the mean frequencies of any pair equals the same constant well-defined value. By virtue of these pairs, a device according to the preferred embodiment can only communicate with a second device if the sum of the mean frequencies of the sub-carrier signals of the two devices exactly equals this constant, well-defined value. Accordingly, by the selection of the corresponding mean frequencies of the frequency oscillators of the two devices, it can be determined which two devices are to communicate with one another.

Illustratively, the devices are divided into two groups, I and II, such that a device of group I communicates with a device of group II. In this context, "communicates" means that information signals, which may represent sound performances, digital signals, measured values or moving television pictures, etc., are transmitted between both devices simultaneously in both directions. Then, mean frequency pairs may be assigned channel designations, and channels selected by each device so that a device of group I communicates with a device of group II if, and only if, the same channel designation is selected by both devices. In other words, channel designations must be coordinated with the mean frequency of the frequency oscillator for all devices of one group.

The channels and mean frequencies are not coordinated arbitrarily. Rather, they are coordinated in such a manner that the arithmetical sum of the mean frequencies of a device from each group I and II, which devices have each selected the same channel, always equals the constant, fixed, channel-independent sum. Thus, the sum signal produced at the mixing stage always has a known and well-defined frequency if both communicating devices have selected the same channel.

Accordingly, each of the devices can simultaneously receive and evaluate the emissions of another similar device, such as sound performances, digital signals, measured values or moving television pictures, etc. If a plurality of devices are operated side by side within an optical working range, a particular device of the plurality of devices can be contacted by selecting the appropriate frequency oscillator mean frequency provided that the device which is to be contacted is sensitive to receiving signals with the selected mean frequency, especially with regard to the electrical filtering.

The mean frequency of the frequency oscillators is preferably stabilized by a phase-locked-loop control circuit. Such a control circuit allows for the very precise maintenance of a predetermined mean frequency yet permits short duration variations to the mean frequency, such as those necessary for frequency modulation. Furthermore, the use of a phase-locked-loop control circuit allows the simple adjustment of the mean frequency to a particular frequency (channel selection).

Preferably, luminescence diodes are used as optical radiation emitters. The wave length of the emitted radiation is suitably in a range of 380 nm to 1000 nm. The wave length of the optical radiation has no influence on the operation of the system according to the invention and can thus be selected in a free manner.

The use of luminescence diodes for the infrared range with a wave length of 750 nm to 1000 nm is especially preferred. These diodes have an especially high efficiency on account of the component's technology and accordingly emit a high intensity of radiation. A high optical output is favorable to increase the possible working range of the transmission to the greatest extent.

In order to further increase the transmission range, the optical emitter is illustratively driven by a half rectified sine wave current signal. In other words, the frequency modulated signal generated by the frequency oscillator generates a current through the luminescence diodes which is proportional to the momentary value of the positive half of a sine wave of the frequency oscillator during the positive half of the sine wave. During the negative half of the sine wave of the signal no current flows through the luminescence diodes. This kind of diode current control emits an optical signal of maximum efficiency from the diodes.

Illustratively, a plurality of optical receivers may be used in a device in order to enlarge the working range. Photo barrier receivers (photodiodes) are especially suited as optical receivers. Of course, the optical receivers are sensitive to the radiation emitted by the optical emitters.

Photodiodes with large photosensitive areas are favorable since more optical radiation is thereby received. The photosensitive area may be increased by using a plurality of parallel photodiodes in order to enlarge the transmission range.

In recovering the remote information signal from the demodulated sum signal, the local information signal, can be removed from the demodulated sum signal of the frequency demodulator. Illustratively, this is achieved in a subtraction stage. Thus, the remote information signal is obtained in an undisturbed manner.

BRIEF DESCRIPTION OF THE DRAWING

The following invention is described by means of specific embodiments in connection with detailed drawings. In the figures.

DESCRIPTION OF THE INVENTION

Figure 1:
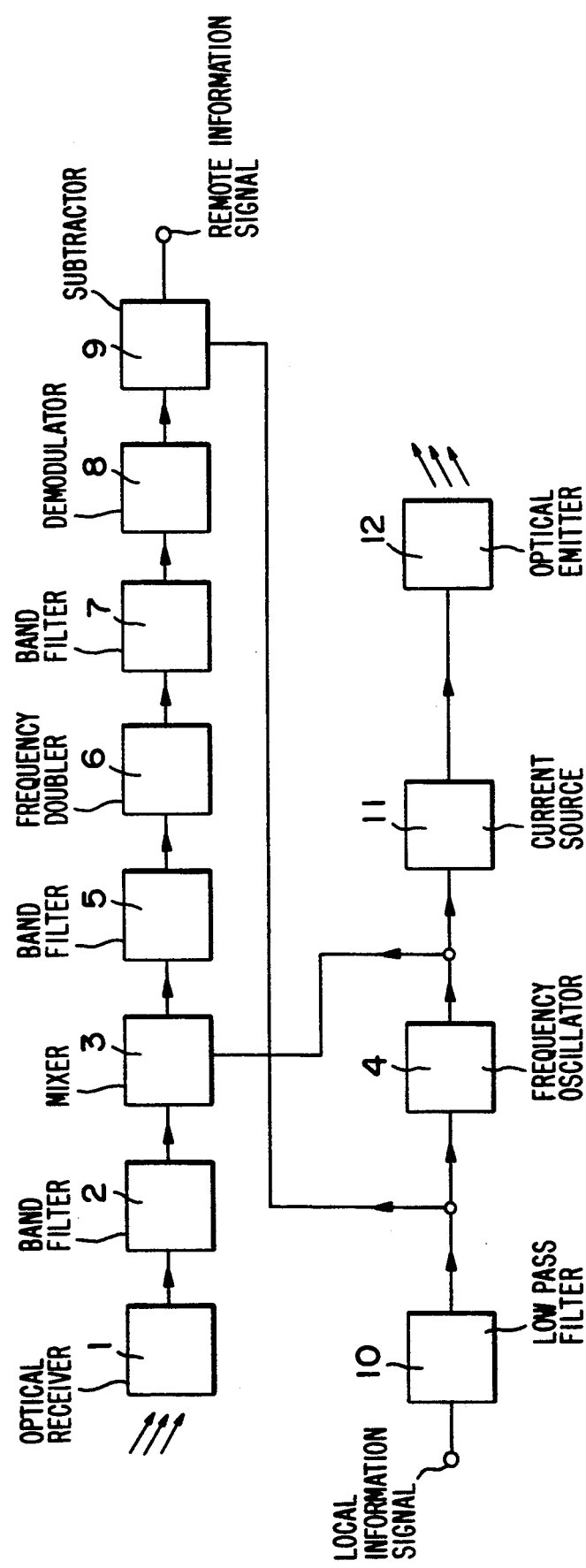
FIG. 1 shows a block diagram of one device according to an embodiment of the invention.

The device shown in FIG. 1 has a low-pass filter 10 which is supplied with the local information signal to be transmitted. This low-pass filter limits the frequency spectrum of the information signal to some upper limit such as 20 kHz.

A frequency oscillator 4 produces a sub-carrier signal onto which the band-limited local information signal is frequency modulated. This oscillator 4 is stabilized with regard to its mean frequency by a phase-locked-loop control circuit in a known manner. The mean frequency of such a stabilized oscillator can be varied in fixed frequency increments in a simple and known manner. Illustratively, the mean frequency has a value of 2.76 MHz. Preferably, the obtainable frequency stroke by the modulating local information signal does not exceed 10 kHz.

The sine wave signal supplied by the oscillator 4 controls a current source 11 causing it to drive a half rectified sine wave current through the luminescence diodes used as optical emitters 12. According to this embodiment, infrared luminescence diodes are used which emit radiation having a wave length of 830 nm. The optical emitter 12 emits a powermodulated optical radiation signal to the surroundings.

This power-modulated radiation signal reaches the optical receiver 1 of a device similar to the device of FIG. 1 (not shown), for instance, via reflection from objects or direct propagation. These two devices, which transmit optical radiation signals to one another, differ only in the selected mean frequency of the respective stabilized frequency oscillator 4.

The power-modulated radiation impinging on the optical receiver 1 of the other device (the same reference numbers are used to refer to the components of the second device as are used for the components of the first device shown in FIG. 1) generates an electrical current signal having the same frequency as the frequency with which the optical emitter of the first device is pulsed. A plurality of parallel photodiodes are illustratively used in the optical receiver 1 which are sensitive to radiation of the wave length 830 nm.

A band filter 2 filters the electrical signal supplied by the optical receiver 1. The mean frequency of such a filter 2 has, for instance, a value of 2.6 MHz and a bandwidth of 1 MHz. The band filter 2 serves to suppress special interferences produced by strongly modulated interference radiators (for instance fluorescent lamps).

Thereafter, the filtered signal is mixed in a mixer 3 with the modulated signal local to the second device produced by the corresponding frequency oscillator 4 of the second device. This mixer 3 can be, for example, a multiplying stage.

The sum signal resulting from mixing the local modulated signal of the second device (produced by modulating an information signal onto a sub-carrier signal) and the signal received from the first device (which is supplied by the optical receiver 1 through the band filter 2) in the mixer 3 is filtered in a filter 5. The filter 5 is a band filter having a fixed mean frequency of 5.35 MHz. The filtered sum signal is supplied by the filter 5 to a frequency doubler 6.

The two devices (between which optical signals are transmitted) differ from one another only by the mean frequencies of their respective frequency oscillators 4. The mean frequencies are always selected such that the sum of the frequencies is a constant, well-defined value. A sufficiently large number of frequency pairs can be found which fulfil this requirement.

The frequency oscillators 4 of the two devices may be adjusted to generate signals having counterpart frequencies of one frequency pair determined in the above manner. If so, it is possible to use the respective modulated signals of each device in a simple manner to both control the corresponding emitter 12 through the current source 11 and to mix the received modulated signal (from the opposite station) in the mixer 3 to exactly produce a sum signal having the constant, well defined frequency.

In the present embodiment, the mean frequency of the frequency oscillator 4 of the fist device is adjusted to 2.76 MHz while the mean frequency of the oscillator 4 of the second device (not shown) is adjusted to 2.59 MHz. If both devices are optically coupled, a sum signal is produced in both the mixer 3 of the first device and in the mixer 3 of the other device (which is not shown), which sum signal has a frequency equal to the constant, well-defined value, i.e., 5.35 MHz. The same is true for other frequency pairs, for instance, 1.89 MHz and 3.46 MHz, 1.99 MHz and 3.36 MHz, 2.56 MHz and 2.79 MHz, 2.86 MHz and 2.49 MHz, etc.

The frequency doubler 6 is, for example, a signal multiplying stage wherein the same signal of the band filter 5 is supplied to the two inputs of the stage 6. A further band filter 7 is provided after the frequency doubler 6 as a selective stage. Finally, a frequency demodulator 8 generates a signal which consists of the linear superposition of the local information signal (from the second device) and the remote information signal (from the first device). Such a superposition results because the modulated signal of the second device, which is mixed with the received modulated signal, is already modulated with the local information signal (of the second device).

The remote information signal (of the first device) is obtained by subtracting the local information signal (of the second device) from the signal generated at the frequency demodulator 8 in a subtractor 9.

Figure 2A:
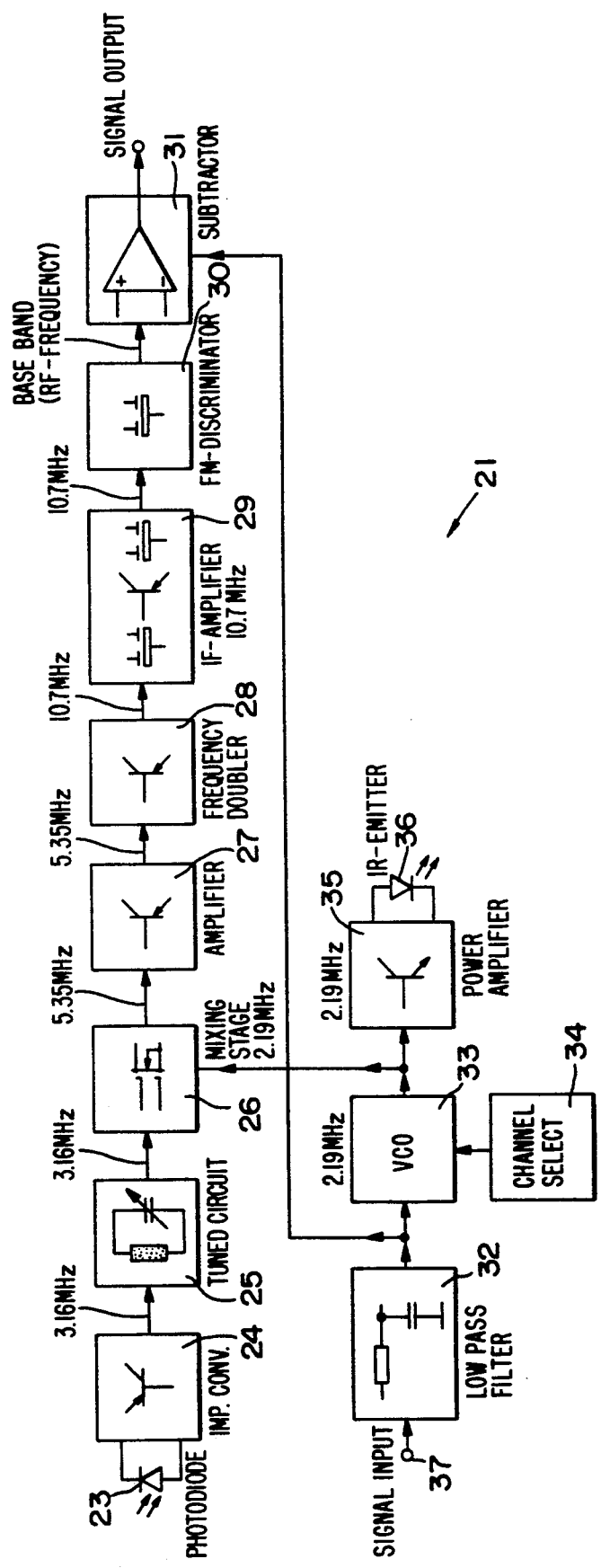
FIG. 2 shows a block diagram according to a second embodiment of the invention.
Figure 2B:
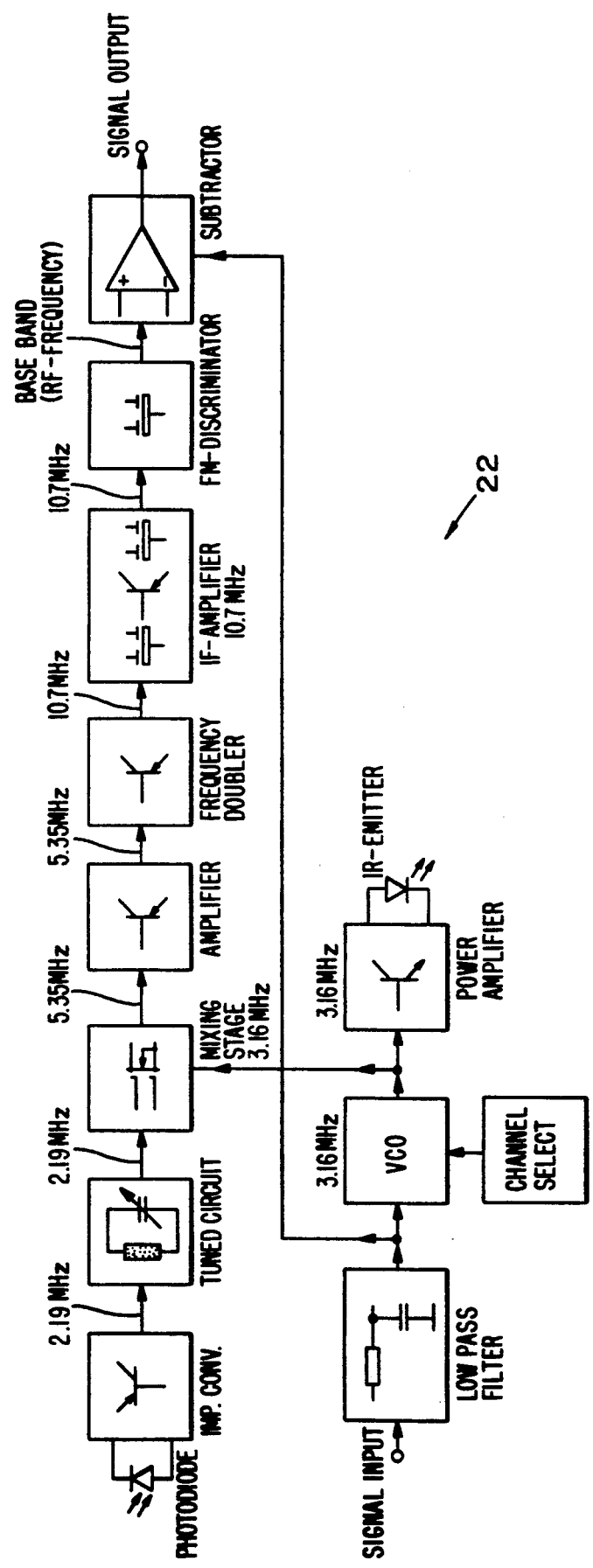

FIG. 2 shows a block diagram of a second embodiment of the invention. In FIG. 2, two transceivers 21, 22 of a communication system are shown. In the following discussion, only the transceiver 21 is explained since the other transceiver 22 is designed correspondingly.

As shown in FIG. 2, the transceiver 21 has a photodiode 23 which transforms the infrared signal emitted by an infrared emitter 36 of the second transceiver 22 into an electrical signal. The signal supplied by the photodiode 23 is fed to an impedance converter 24 and then to a band pass filter (tuned circuit) 25. The filtered signal is fed to a mixing stage 26 where it is mixed with the local VCO signal of a voltage-controlled oscillator 33 to produce a first intermediate frequency signal at 5.35 MHz.

After amplification by an amplifier 27, the frequency of this first intermediate frequency signal is doubled to 10.7 MHz in a frequency doubler 28. The signal output from the frequency doubler 28 is band filtered and confined in an IF amplifier 29.

An FM discriminator 30 obtains the base band information which, in this case, consists of the linear superposition of the information signal transmitted by the other transceiver 22 with the information signal emitted locally. Then, the information signal to be received is obtained by subtraction of the local information signal from this signal mixture in a subtracting stage 31.

The information signal to be emitted, and present at the signal input 37 of this transceiver 21, is confined to its bandwidth in a low pass filter 32. This is necessary in order to confine the spectral bandwidth after the modulation. This signal modulates the frequency of the voltage-controlled oscillator 33 in a known manner. The mean frequency of the voltage controlled oscillator 33 can be adjusted by means of a channel selection circuit 34. The signal (VCO signal) outputted by the voltage-controlled oscillator 33 controls a corresponding infrared emitter 36 via a power amplifier 35.

I claim:

1. A simultaneous, bidirectional waveguide-free optical communication system comprising a plurality of optical transceivers, each transceiver comprising:

frequency oscillator means for frequency modulating a first information signal onto a subcarrier signal having a particular mean frequency to produce a first frequency modulated signal, emission means for emitting an optical signal corresponding to said first frequency modulated signal produced by said frequency oscillator means, detector means for, simultaneously with emission of said optical signal by said emission means, receiving at least one other optical signal including a second frequency modulated signal from another second optical transceiver, mixing means for mixing said first frequency modulated signal produced by said frequency oscillator means and said optical signals received by said detector means to produce an intermediate frequency signal, frequency demodulation means responsive to said intermediate frequency signal output by said mixing means and said first information signal, for recovering a second information signal from said intermediate frequency signal.

2. The system of claim 1 wherein each transceiver comprises only one frequency oscillator means.

3. The system of claim 1 wherein said mean frequency of said frequency modulated signal of each of said transceivers is individually adjustable.

4. The system of claim 3 wherein each transceiver of a communicating pair of transceivers generates a frequency modulated signal with a different mean frequency and wherein the sum of said mean frequencies of each pair equals the same frequency sum.

5. The system of claim 4 wherein a channel is designated for each pair of mean frequencies whose sum equals said frequency sum, said transceivers being divided into two groups such that a first transceiver of said first group only communicates with a second transceiver of said second group if both said first and second transceivers are adjusted to the same channel.

6. The system of claim 1 wherein said frequency oscillator means of each transceiver comprises a phase-locked-loop.

7. The system of claim 1 wherein each transceiver further comprises frequency multiplication means, connected between said mixing means and said demodulation means, for changing a frequency range of said intermediate frequency signal.

8. The system of claim 7 wherein each transceiver further comprises band filter means, connected between said frequency multiplication means and said demodulation means, for filtering signals whose frequency ranges are changed by said frequency multiplication means.

9. The system of claim 1 wherein each transceiver further comprises band filter means, connected between said mixing means and said demodulation means, for filtering intermediate frequency signals produced by said mixing means.

10. The system of claim 1 wherein said emission means of each transceiver comprises at least one luminescent diode which emits optical radiation having a wavelength in the range of 380 nm to 1000 nm.

11. The system of claim 10 wherein said first frequency modulated signal comprises a half rectified sine wave subcarrier signal.

12. The system of claim 1 wherein said detector means comprises at least one photodiode, said photodiode having a spectral sensitivity in the range of 380 nm to 1000 nm.

* * * * *